United States Patent
Mehta

(10) Patent No.: US 7,372,874 B2
(45) Date of Patent: May 13, 2008

(54) METHOD AND DEVICE FOR SYNCHRONISATION IN OFDM

(75) Inventor: Mehul Mehta, Reading (GB)

(73) Assignee: Synad Technologies Limited, Berkshire (GB)

( * ) Notice: Subject to any disclaimer, the term of this patent is extended or adjusted under 35 U.S.C. 154(b) by 802 days.

(21) Appl. No.: 10/703,317

(22) Filed: Nov. 7, 2003

(65) Prior Publication Data

US 2004/0170197 A1 Sep. 2, 2004

(30) Foreign Application Priority Data

Dec. 3, 2002 (GB) .................. 0228184.8

(51) Int. Cl.
*H04J 3/06* (2006.01)
(52) U.S. Cl. ...................... 370/504; 370/512
(58) Field of Classification Search ................ 370/503, 370/504, 505, 509, 510, 511, 512, 513, 514
See application file for complete search history.

(56) References Cited

U.S. PATENT DOCUMENTS

| | | | |
|---|---|---|---|
| 7,069,577 B2* | 6/2006 | Geile et al. ................ | 725/106 |
| 2001/0015988 A1 | 8/2001 | Sawada et al. | |
| 2003/0206559 A1* | 11/2003 | Trachewsky et al. ....... | 370/509 |
| 2007/0174890 A1* | 7/2007 | Geile et al. ................ | 725/129 |

FOREIGN PATENT DOCUMENTS

| | | |
|---|---|---|
| EP | 1 178 638 A1 | 2/2002 |
| EP | 1 071 251 A3 | 2/2003 |
| WO | WO 97/36395 | 10/1997 |
| WO | WO 00/77961 A1 | 12/2000 |

* cited by examiner

*Primary Examiner*—Ajit Patel
(74) *Attorney, Agent, or Firm*—Blakely, Sokoloff, Taylor & Zafman; Stephen M. De Klerk

(57) ABSTRACT

A method of synchronising an Orthogonal Frequency Division Multiplexed (OFDM) IEEE 802.11a data packet at a receiver is disclosed. The 802.11a data packet has a series of short training sequence (STS) symbols as a preamble. Cross-correlation at the receiver of the STS in the 802.11a packet PLCP preamble with the modified reference STS, that is circular shifted by eight samples, results in a main correlation peak but with reduced pre- and post-lobes.

To locate the cross-correlation peak, a running second derivative of the cross-correlation function is performed. Peak selection employs a running comparison of the position and magnitude of all peaks in the intermediate neighbourhood of the local peaks. Following selection of a peak from within the cross-correlation function of the first STS in the PLCP preamble, both the position and magnitude of the first STS is compared to those of the second STS. Based on the two independent calculations, the start of the OFDM frame is estimated.

15 Claims, 11 Drawing Sheets

METHOD AND DEVICE FOR SYNCHRONISATION IN OFDM

CROSS-REFERENCE TO OTHER APPLICATIONS

This Application claims priority from Great Britain Patent Application No. 0228184.8, filed on Dec. 3, 2002.

FIELD OF THE INVENTION

The present invention relates to synchronisation methods, particularly although not exclusively for Orthogonal Frequency Division Multiplexing (OFDM) communication schemes.

BACKGROUND OF THE INVENTION

The IEEE802.11 standard outlines the media access control (MAC) and the Physical Layer (PHY) layer specifications for wireless LAN. Two major variants have emerged from the IEEE 802.11 specifications, namely the 802.11b and 802.11a standards. More specifically, the IEEE802.11b emerged from 802.11 as the "high rate" and Wi-Fi™ standard specifying the DSSS system to operate at 1, 2, 5.5 and 11 Mbps. The IEEE 802.11b compliant devices operate in only the 2.4000 GHz ISM band between 2.4000 and 2.4835 GHz, while IEEE 802.11a, hereinafter referred to as '802.11a', compliant devices operate at the higher 54 Mbs rate in the 5 GHz band, which supports even higher data rates owing to the implementation of Orthogonal Frequency Division Modulation (OFDM).

802.11a specifies the PHY layer operating in the 5 GHZ band using the orthogonal frequency division modulation (OFDM) scheme to modulate the data. The orthogonal frequency division multiplexing scheme allows high data rate transmission by dividing the data streams into a number of lower data rate streams and then transmitting each one on a separate sub channel. An OFDM signal consists of a sum of subcarriers that are modulated by using Phase Shift Keying (PSK) or Quadrature Amplitude Modulation (QAM). The signals are generated by Fourier Transformations.

In order to demodulate the received signal, an 802.11a receiver has to synchronise. An OFDM synchronisation method performs two main tasks. First, the method must derive an optimum sampling instance and hence determine the symbol boundaries to minimise the effects of inter-subcarrier interference (ICI) and intersymbol interference (ISI). Secondly, the method estimates and corrects the carrier frequency offset of the received signal to avoid ICI.

Owing to low receiver sensitivities there is a loss in the peak magnitude, and multipath leading to distortion. The current invention provides for a solution to the optimum sampling instance for determining the symbol boundaries to minimise the effects of inter-subcarrier interference (ICI) and intersymbol interference (ISI). This relates to one aspect of the synchronisation method.

A typical example of OFDM physical layer is the IEEE 802.11a standard, hereinafter referred to as '802.11a'. The PLCP (Physical Layer Convergence Procedure) preamble consists of pre-defined sets of OFDM signals, which are intended for use in synchronisation. In accordance with the 802.11 medium access control (MAC) protocol, the receiver constantly scans the medium to establish whether or not it is busy or free for transmission. The receiver uses the preamble as a reference signature to establish the presence of a packet on air. Once the preamble is recognised at the receiver, the synchronisation method establishes an appropriate sampling interval and the rest of the packet is demodulated and decoded by the modem PHY.

The skilled addressee would acknowledge that a sequence of 10 identical symbols as shown in FIG. 1, each constituting a pre-defined short training sequence (STS), is transmitted as the preamble of a frame. Typically, the receiver identifies the reception of a packet by cross correlating the received signal block against the STS. The OFDM signal (t1, t2, ... ) is generated using the standard equations that would be familiar to a person skilled in the art. The correlation process produces peaks for every identical short training sequence received. By implementing a threshold detector, it is possible to identify the position of the periodic correlation peaks, and hence the detection of an OFDM frame and the consequent symbol boundaries.

However, in wireless communications, the transmit signal is distorted due to the composite of multipath fading and signal shadowing. In addition, the auto-correlation profile of the STS manifests notable pre and post cursors either side of the correlation peaks, which obscures the correlation peaks required for synchronisation. In multipath conditions, the cross correlation of the received signal preamble with the STS shows dominant peaks before the desired correlation peak. Consequently, a threshold based peak detector fails to isolate the correct peak and hence the symbol boundaries are incorrectly identified. Furthermore, frame start position is also incorrectly calculated.

The current invention addresses the problem of synchronisation based on short training sequences for the IEEE 802.11a standard; however, the ensuing solution is equally applicable to other OFDM schemes. Hence, to overcome the limitations of the methods for synchronisation of receivers known to the skilled addressee, the current invention provides for a solution to the problems of synchronisation within any packet switched network or system using short training sequences, wherein the PHY layer packets are transmitted over air are synchronised at the receiver by exploiting the presence of a predefined packet preamble.

SUMMARY OF THE INVENTION

According to a first aspect of the current invention there is provided a method of identifying a signature point within at least one received digital data frame transmitted over a communication link, said received frame containing a plurality of predefined identification markers, the method comprising the steps of generating a signal whose magnitude is determined by the correlation of a reference signal with first and second predefined identification markers in the received signal, comparing, with a threshold, at least a first and second magnitude of the signal when the gradient of the correlated signal reaches or crosses a predetermined value, storing the first and second signal magnitudes, and the corresponding first and second sample times thereof when said first and second magnitudes exceed said running threshold; identifying the presence of the signature point within the data frame on the basis of the gap between the first and second sample times.

Advantageously, said predetermined value of said gradient is indicative of a local maximum of the generated signal, and the gradient of the signal is only measured for a specified number of correlation samples.

Preferably the method further comprising ceasing the aforementioned comparing step if said first and second magnitude does not reach said threshold within a defined number of correlation samples.

Advantageously, the threshold is the average signal strength of said generated signal over a predetermined number of correlation samples, and average signal strength is weighted by a scalar value.

Preferably, the method further comprising the calculating the start time of the received data frame on the basis of the identified signature point, synchronising the digital data frame in accordance with the identified signature point, and determining the sampling point of the received signal on the basis of the identified signature point.

In a preferred embodiment the method further comprising, searching within a number of correlator samples around the first and second sample times for a third magnitude that is substantially the same as the first or second magnitude, the corresponding third sample time thereof being stored, searching within a number of correlator samples around the first and second sample times for a third magnitude that is substantially the same as the first or second magnitude, the corresponding third sample time thereof being stored, and recalculating the start time of the received data frame in accordance with the third sample time.

In a further preferred embodiment, the reference signal corresponds with one of said predefined identification markers, and the reference signal is derived from one of said predefined identification markers.

In a second aspect of the preferred invention, there is provided a method of generating a signal indicating, in at least one received digital data frame transmitted over a communication link, the presence of at least one predefined identification marker, the method comprising, generating a first signal based on said predefined identification data marker but circular shifted by a predefined amount; and generating an output signal based on the correlated product of said first signal with said received predefined identification marker.

Preferably, the generated version of said predefined identification marker is left circular shifted, and said predefined amount is 8 samples.

In a preferred embodiment, an Application Specific Integrated Circuit (ASIC) is arranged to perform the steps comprised in the methods.

In a further embodiment, a computer program comprising software code portions may perform the steps of the method, when said program is run on a processor.

Preferably, a storage medium contains the computer program for performing the steps of the method. Further, it is preferred that a carrier signal containing the computer programs.

In a further embodiment of the present invention there is provided a wireless local area network receiver comprising a receiver for receiving at least one digital data frame having a predefined digital data sequence contained therein, and a processor arranged to implement the computer programs.

BRIEF DESCRIPTION OF THE DRAWINGS

A preferred embodiment of the present invention will now be described, by way of example only, in relation to the following figures in which.

DETAILED DESCRIPTION OF A PREFERRED EMBODIMENT OF THE PRESENT INVENTION

The 802.11 standard determines the Medium Access Control (MAC) and Physical Layer (PHY) Specifications for wireless local area networks (LANs). In the ensuing text, full descriptions of the 802.11 and 802.11a wireless network standards are omitted, it being understood that this forms part of the general knowledge of the skilled addressee.

Personal computers (PCs), laptops and other portable devices incorporate Network Interface Cards (NICs) into the system architecture, which permits it to be connected to the wireless network and to other such devices. The laptop can communicate via an access point (AP) with other devices within the wireless network, or the wired network in a basic service set (BSS), using the distribution service of the distribution system (DS). The NIC of the laptop can interface with one or more networks, for example the 802.11b and 802.11a, either as a single mode or dual mode connection to an AP.

Figure 2:
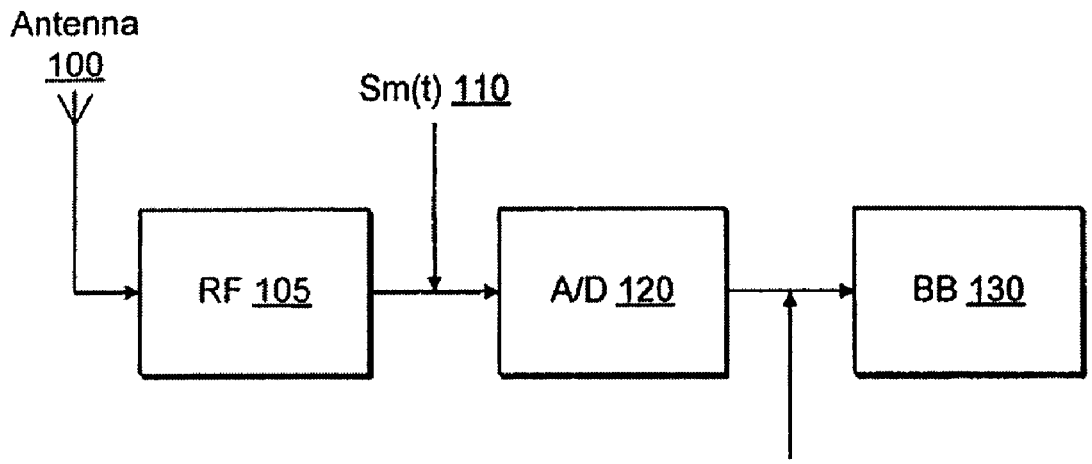
FIG. 2 shows a typical functional blocks of wireless LAN application specific integrated circuits (ASICs)

FIG. 2 shows the typical functional blocks of wireless LAN application specific integrated circuits (ASICs) including antenna 100 for receiving a signal $S_m(t)$ 110, an RF portion 105, an analogue to digital part 120 for sampling and yielding a digital signal $S_d(nT)$ 125 which is fed into the baseband integrated circuit (BBIC) 130.

The objects of the current invention are achieved by implementing two primary steps: a reference sequence for cross-correlating it with the received frame; and a low complexity peak find and search (PFS) method for calculating frame start value for a received packet.

One of the objects of the current invention is to provide for a reference sequence for cross correlating the received frame, which reduces the probability of a dominant peak arising as a result of the STS autocorrelation precursors. The latter is the case if the received signal is cross-correlated with the STS, as present in the transmit frame preamble.

Another object of the current invention is to provide for a low complexity Peak Find and Select (PFS) method, which helps to identify the correct correlation peaks. One of the advantages of the current invention lies with the PFS method's capability to converge on the correct peaks even if multipath has displaced the location of the STS correlation peak to an unexpected position.

Figure 3:
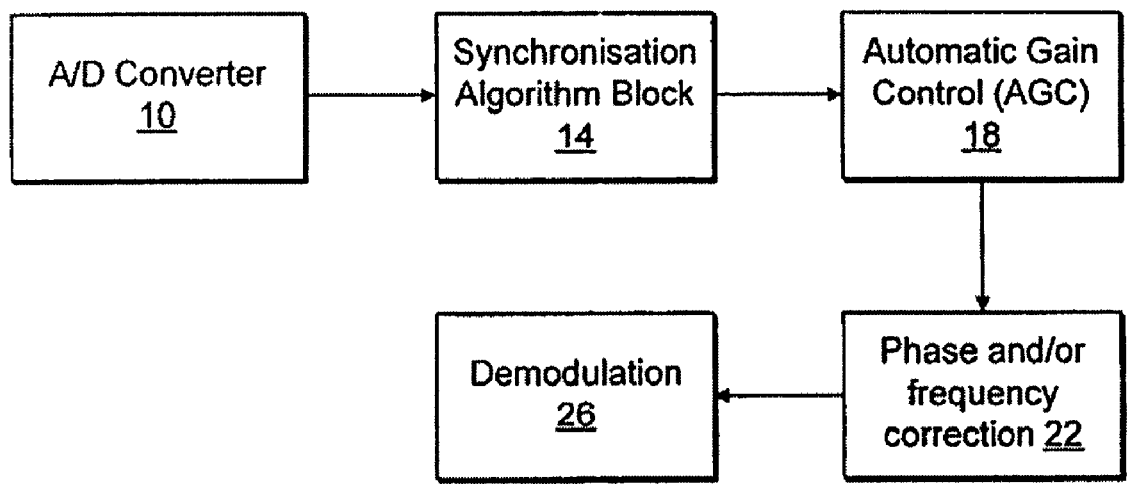
FIG. 3 shows a functional block diagram of an application specific integrated circuit (ASIC) according to a preferred embodiment.

Referring to FIG. 3, the instructions necessary to implement the protocols are held on application specific integrated circuits (ASICs), which includes the A/D converter and modem elements. The peak find method of the current invention is implemented in hardware within the baseband integrated circuit (BBIC), wherein the converted signal $S_d(nT)$ from the analogue to digital converter (A/D) 10 is sent to the synchronisation block 14 for implementing the peak find and select method of the current invention so as to calculate the packet start value for a received 802.11a packet. Thereafter the rest of the synchronisation method uses this reference counter to perform further functions, for example, to allow automatic gain control (AGC) 18, followed by phase and /or frequency correction 22 and demodulation 26.

The methods adopted, by the skilled addressee, to identify the presence of a valid packet is to continuously cross-correlate received signal samples with the pre-defined STS. The magnitude of the cross-correlation function $r_{y,STS}(.)$ is then observed for the presence of a valid signal.

$$r_{y,STS}(n) = \sum_{l=0}^{N-n-1} y(n) \cdot STS^*(l+n); n \geq 0 \qquad (1)$$

where $y(nT_s)$ is the baseband equivalent complex valued received signal, $T_s$=40 MHz, and STS* is the complex conjugate.

Figure 1:
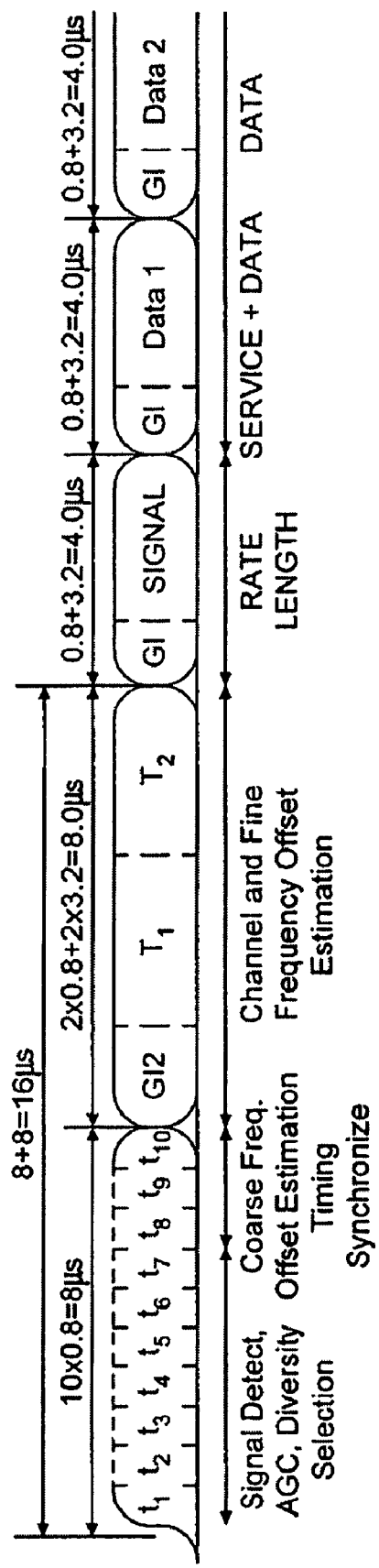
FIG. 1 shows a timing diagram of Physical Layer Convergence Procedure (PLCP) preamble.

Fundamentally, the process of timing recovery using STS involves cross-correlating the received signal with the STS at the receiver. The magnitude of the cross-correlator output is then observed with the potential of finding strong periodic correlation peaks. The latter would be observed if the received signal were to be the PLCP preamble of a valid 802.11a packet, as shown in FIG. 1.

Figure 4:
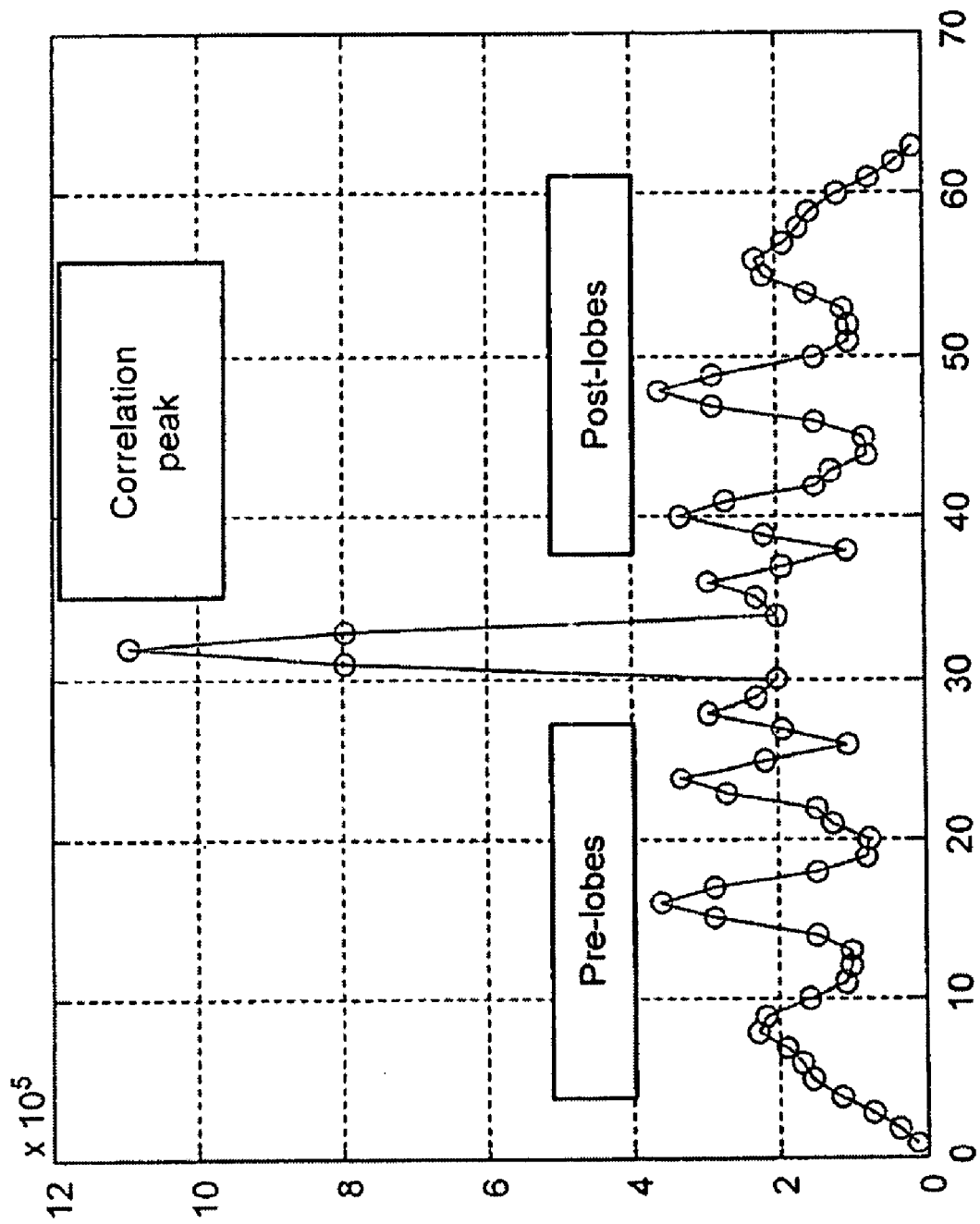
FIG. 4 shows a graph of the pre-lobes before the main correlation peak and post-lobes after the main correlation peak in the prior art.

The magnitude of the STS autocorrelation shows the characteristic correlation peak after 32 samples. However, it shows notable pre-lobes before the main correlation peak and post-lobes after the main correlation peak, as shown in FIG. 4. The presence of these peaks is due to the non-ideal correlation properties of the STS number sequence. Whilst it is easy to detect the main correlation peak, in reality the existence of strong pre and post-lobes does restrict the degree of freedom available in discriminating the desired main peak from the rest. The problem is particularly acute given the presence of AWGN and multipath distortion.

In order to contain these undesirable peaks, the present invention provides for a reference STS such that its cross-correlation with the received PLCP preamble will yield pre and post lobes of reduced magnitude. This would help increase the margin of discriminating the main correlation peak from the rest. It is determined that a shifted version of the STS facilitates in yielding pre and post lobes of reduced magnitude. The optimum reference STS is a circular shift of the STS by 8 samples.

Figure 5:
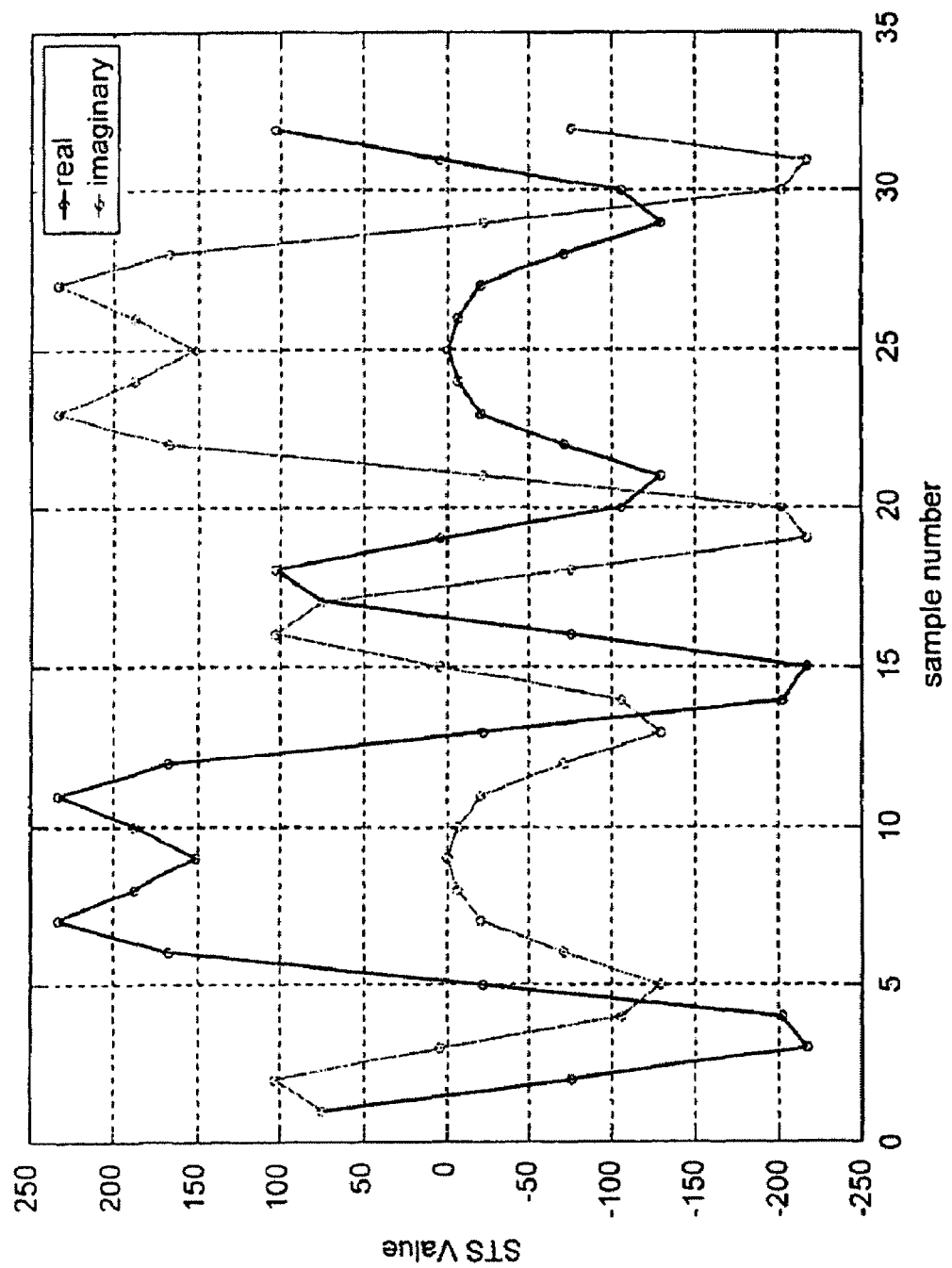
FIG. 5 shows a graph of the complex valued STS vector according to the present invention.
Figure 6:
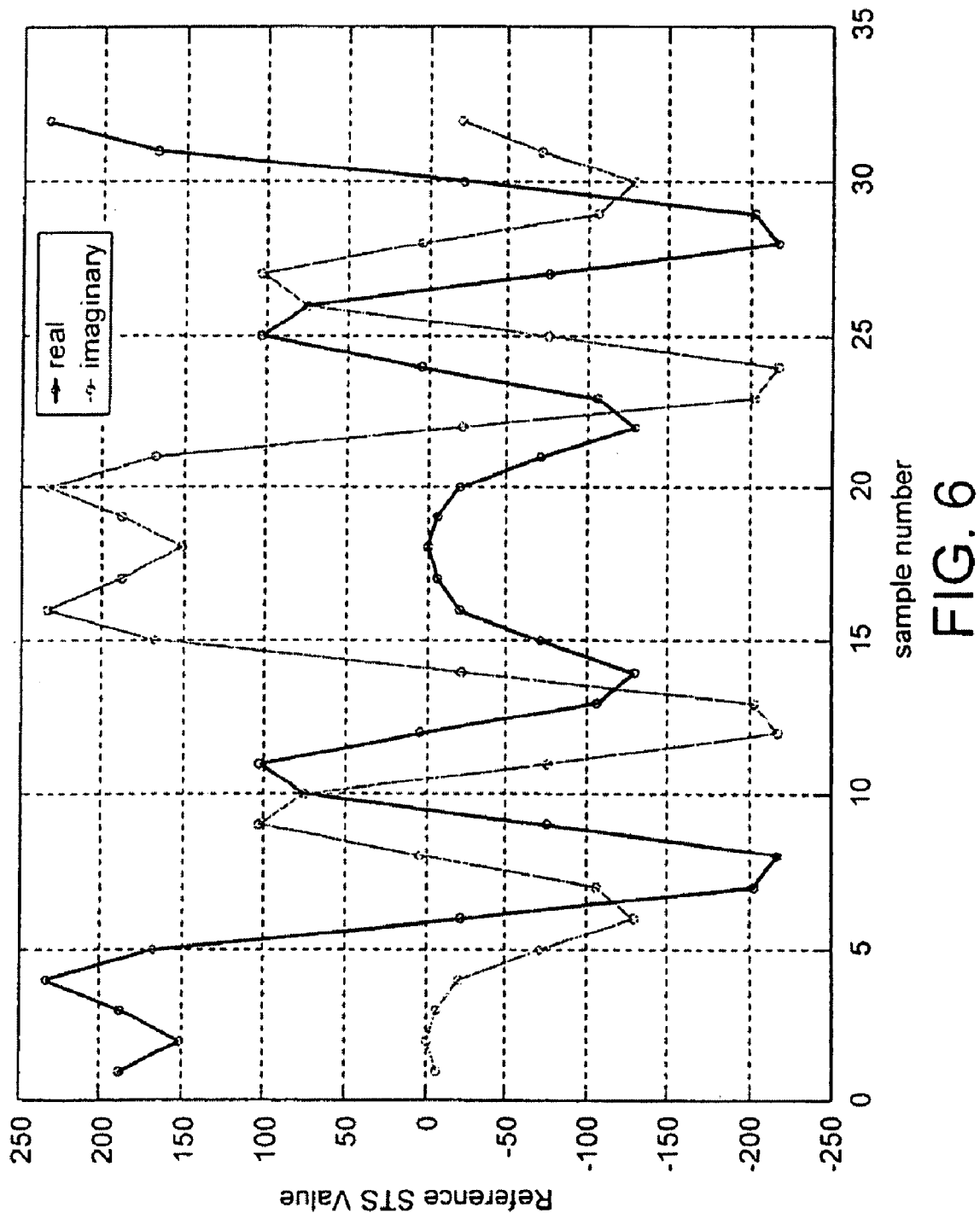
FIG. 6 shows a graph of the complex valued derived reference STS according to the present invention.

Graphs of the complex valued STS vector and the derived reference STS are shown in FIGS. 5 and 6 respectively.

Figure 7:
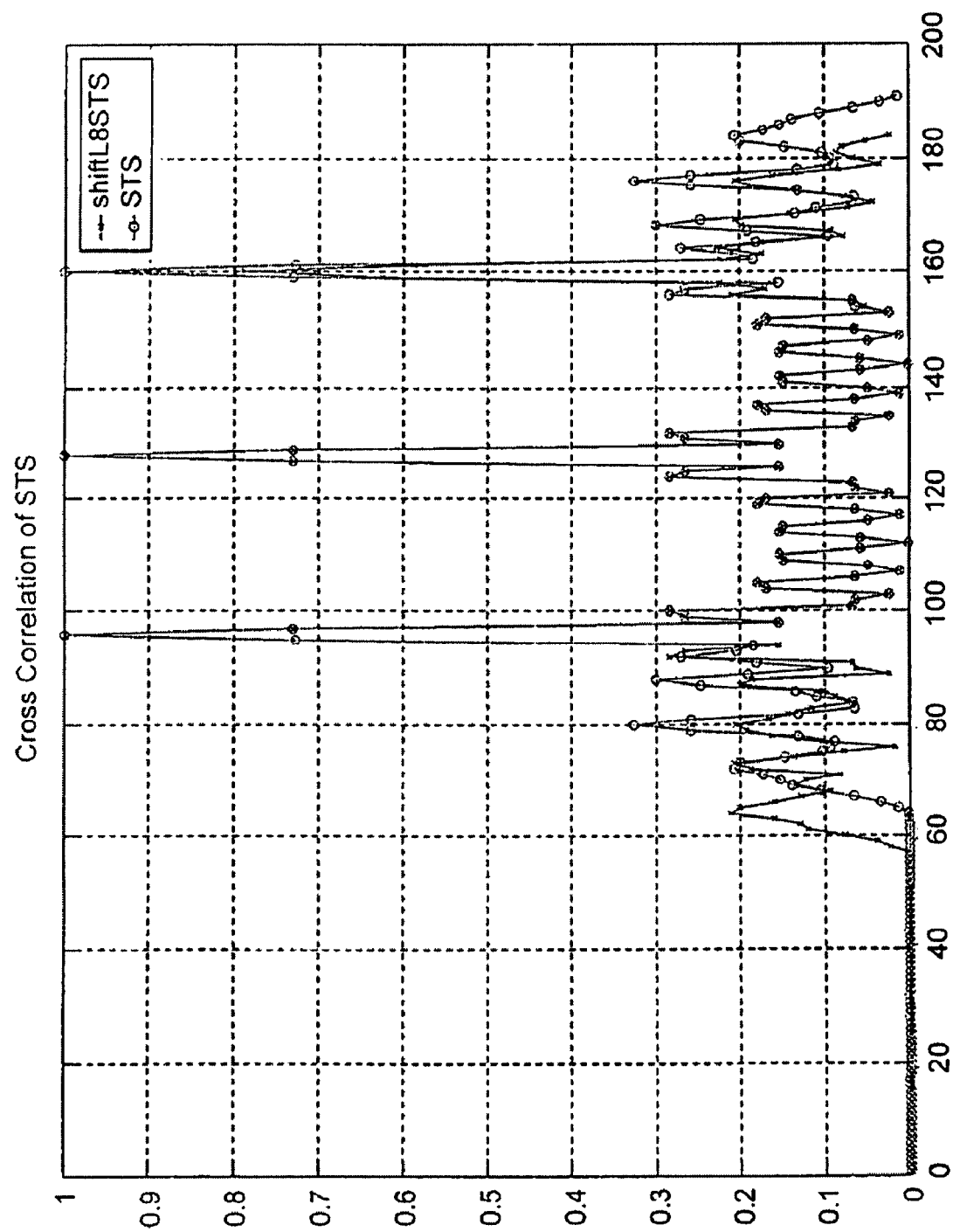
FIG. 7 shows an example of a cross-correlation output graph according to a preferred embodiment of the present invention.

In order to confirm this, cross-correlation outputs using STS (default sequence) and the revised STS are compared. In both cases, identical PLCP preamble is cross-correlated with the default STS and then with the shifted version. Performance with and without multipath is noted. An example of a cross-correlation output graph of these trials is shown in FIG. 7. Clearly, the use of the altered STS to cross-correlate the received signal helps reduce the magnitude of the pre and post lobes without affecting the magnitude of the mid-lobes. This is observed for instances with and without multipath. Therefore the received signal is cross-correlated with the revised STS. Consequently, equation (1) is rewritten as, $$r_{y,STS}(n) = \sum_{l=0}^{N-n-1} y(n) \cdot STS^*_{ref}(l+n); n \geq 0 \qquad (2)$$

where, $$STS_{ref} = \{STS_8, STS_9, STS_{10}, \ldots, STS_{32}, STS_1, STS_2, \ldots, STS_7\} \qquad (2.1)$$

where the shifted short training sequence in accordance with one aspect of the current invention is denoted $STS_{ref}$ and $STS^*_{ref}$ is the complex conjugate thereof.

The object of the current invention is to provide for a method of identifying cross correlation peaks, selecting the most appropriate ones, and using the position of the selected peaks to estimate the start of the OFDM frame and hence establish the symbol detection boundaries. In doing so, it also has to accurately detect the presence of an OFDM frame from the cross correlation profile.

There are two parts to this method, namely, peak find and peak select. The Peak Find method performs a running second derivative of the cross correlation function, in order to find local maxima.

The Peak Select method identifies the peak corresponding to the first multipath component from within the cross correlation peaks of the first and second STS. Whilst the IEEE 802.11a standard facilitates 10 STS within the frame preamble, it is highly desirable to identify the start of the frame as soon as possible. The Peak Select method performs a running comparison of the position and magnitudes of all peaks within the immediate neighbourhood of the local peaks. Following the selection of a peak from within the cross correlation function of the first STS, it then compares it (both position and magnitude) to that of the second STS. Based on these two independent calculations, it estimates the start of the frame.

The current invention provides for a timing recovery method is to devise a routine that identifies and STS correlation peak due to the $1^{st}$ multipath component of channel impulse response. The strongest observed correlation peak is not necessarily the one corresponding to the $1^{st}$ multipath tap. Therefore, the method of the current invention identifies the most appropriate correlation peaks from within the plethora of uncorrelated peaks, in the presence of AWGN. The Peak Find method (PFA) of the current invention is designed to identify and select the most appropriate STS correlation peaks in order to derive optimum sampling instance for any given received packet.

Figure 8:
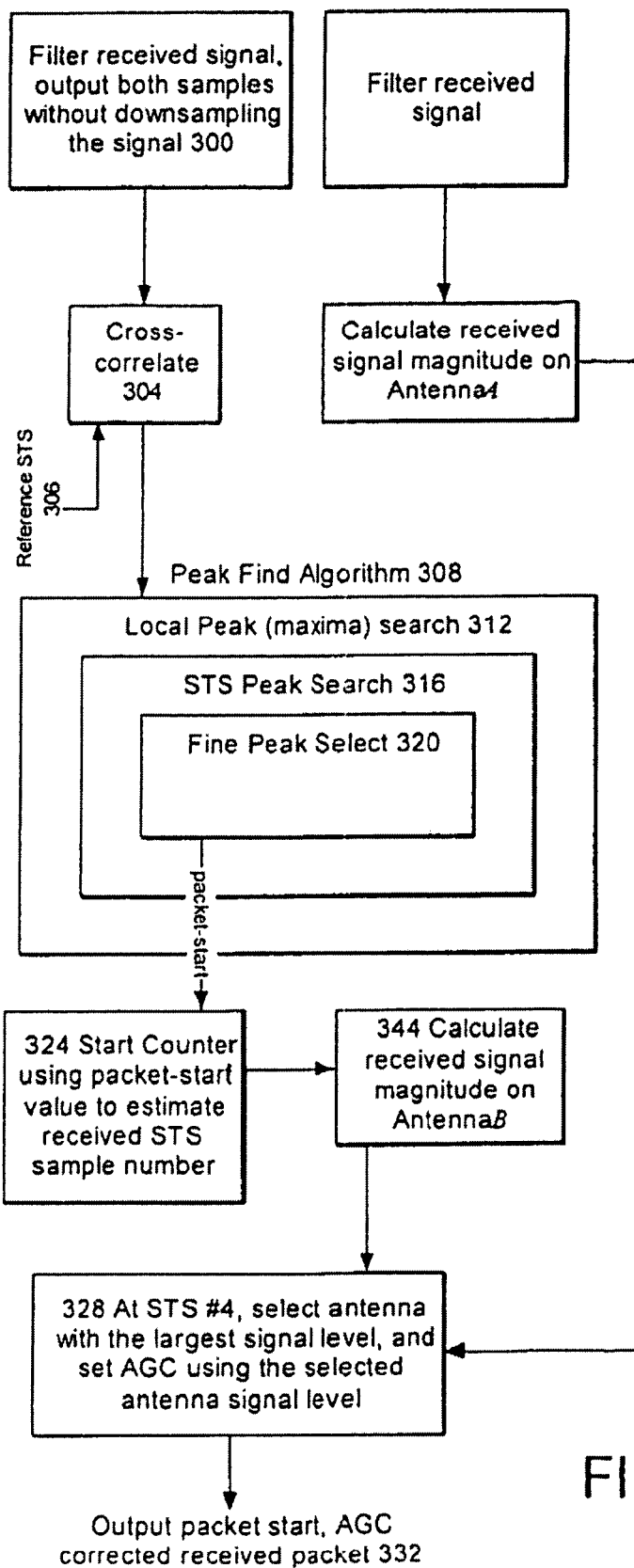
FIG. 8 shows a flow diagram of the synchronisation method in accordance with the present invention.

FIG. 8 shows a flow diagram of the synchronisation method in accordance with the present invention. The received signal 300 is cross-correlated with the reference STS sample vector 306 within the cross-correlator 304 in accordance with equation 2. The magnitude of the correlator output is then fed into the PFA 308, wherein the data is processed in the local peak search 312, STS peak search 316 and the fine peak select 320 portions of the method. The PFA 308 uses the correlator output to establish the start of a packet, if a valid 802.11a OFDM packet is received. It is scheduled to constantly search for STS correlation peaks. And so until it finds a packet-start value, the method will go on repeating itself for every correlator output. Subsequently, the packet start value may be used as a counter to estimate the received STS sample number 324, calculate the received signal magnitude on an antenna, and consequently, set the automatic gain control 328 (AGC).

The principal functionalities of the PFA are: to detect the presence of the PLCP preamble of a valid 802.11a packet; to search and identify the most appropriate STS correlation peaks; and to calculate the start of the packet in order to establish best possible sampling instance.

Once the PFA has calculated packet-start value for a received 802.11a packet, the rest of the synchronisation method uses this reference counter to perform other functions such as antenna selection and AGC update is this part of the invention.

The PFA performs a search and select operation on the correlator output. It incorporates mechanisms to mitigate the effects of AWGN and multipath propagation. The use of a reference STS to perform the cross-correlation function helps ensure sufficient degree of freedom for the PFA to identify the correlation peaks instead of converging on the uncorrelated peaks. The latter referred to as a 'false-trigger' and it is highly undesirable. The PFA is said to have false triggered when it converges to uncorrelated peaks instead of the desired STS correlation peaks.

Referring to flow chart of FIG. 8, the PFA 308 consists of 3 inter-working routines and each is nested within one another. The first routine is the Local Peak Search (LPS) 312, which identifies peaks within a sliding window of 3 correlator outputs; thus it searches and marks out the local maxima in the correlator output stream. All LPS peaks P are elements of the set P.

Secondly, referring to FIG. 8, the STS Peaks Search (SPS) 316 aspect of the method uses the local peaks to detect the presence of a valid PLCP preamble. If so, then it marks all subsequent local peaks as those due to the received PLCP cross-correlating with the reference STS, and they are referred to as STS peaks, $P_{tn}$. Thereafter, the SPS identifies peaks that are most likely to be due to the $1^{st}$ multipath component of the channel impulse response. These are referred to as STS_MAX peaks and denoted as, $P^1_{tn}$. The SPS then implements an iterative test on the magnitude and location of found STS_MAX peaks to establish a pair of correlation peaks, each corresponding to the $1^{st}$ multipath component, following reception of STS#1 (i.e., $t_1$) and STS#2 (i.e., $t_2$) of the PLCP preamble respectively. These two peaks are referred to as MAX_PEAKS and denoted as, $P^1_{t1}$ and $P^1_{t2}$. Given that STS correlation peaks are observed every 32 samples of the correlator output, the positions of $P^1_{t1}$ and $P^1_{t2}$ is then used to estimate the start of the received packet.

Thirdly, the Fine Peak Select (FPS) aspect of the PFA checks the position and magnitude of $P^1_{t1}$ relative to $P^1_{t2}$ and also within the immediate neighbourhood of these two peaks.

For the sake of clarity, $\{P^1_{t1}, P^1_{t2}\} \subset \{P^1_{t1}, P^1_{t2}, \ldots, P^1_{t10}\} \subset \{P_{t1}, P_{t2}, \ldots, P_{t10}\} \subset P$. Also, the FPS resides within the SPS and that resides within the overall LPS routine.

The ensuing text describes an embodiment of the LPS aspect of the peak find and select method of the current invention. This is the outer most loop of the PFA method. This routine searches for local peaks from within the output of the cross-correlator (defined in equation (2)). The $n^{th}$ correlator output is assumed to be a local peak if it satisfies the expression in equation (3) below. Both magnitude and position of every $m^{th}$ found local peak is noted. It is assumed that all local peaks P(m) are elements of a set P.

$$P(m)=|r_{y,STS}(n-1)|, \quad \text{where} |r_{y,STS}(n-2)| \leq |r_{y,STS} \\ (n-1)| \geq |r_{y,STS}(n)| \quad (3)$$

Figure 9:
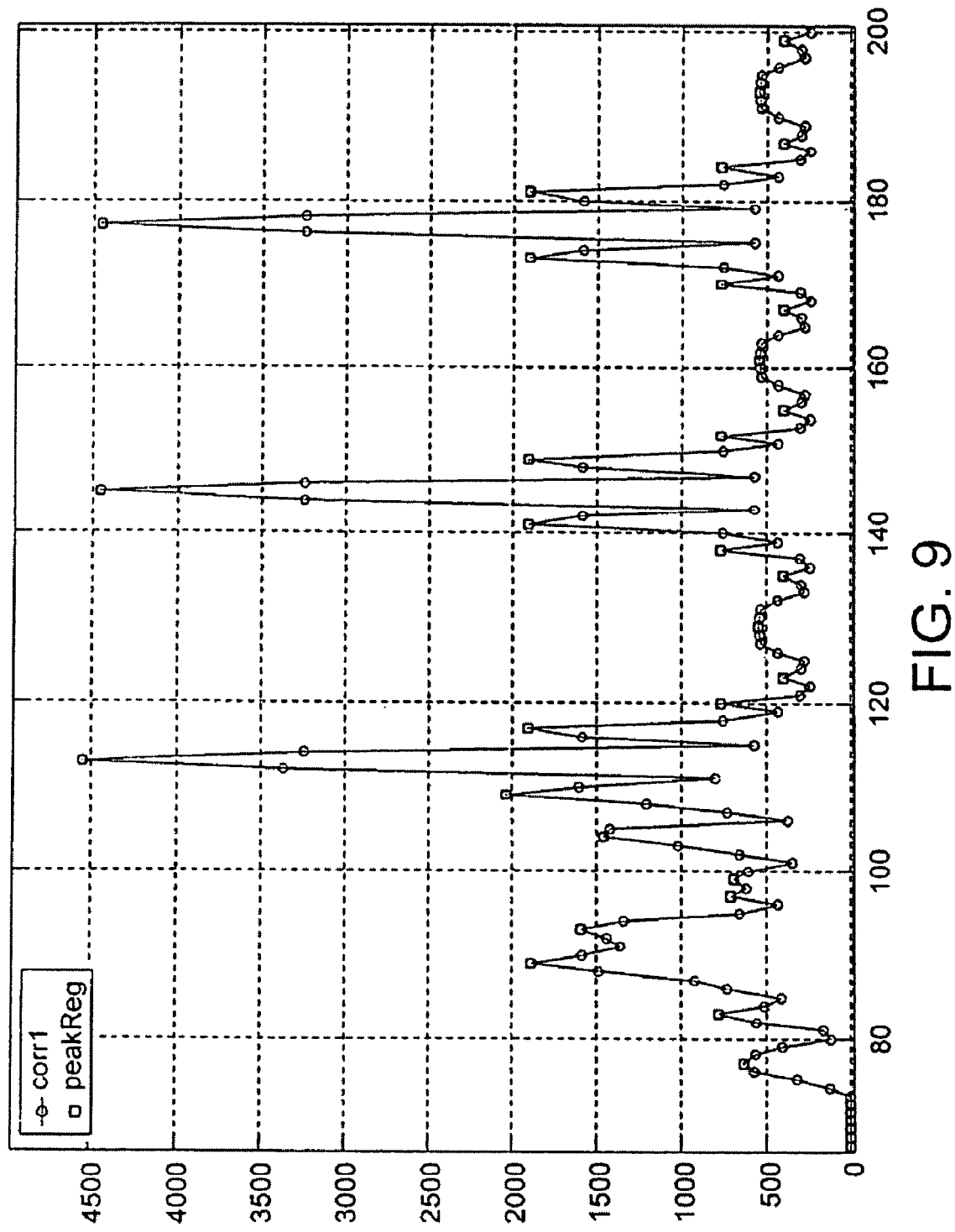
FIG. 9 shows a graph of the magnitude of the cross-correlator output ($|r_{y,STS}(n)|$) according to the present invention.

The graph in FIG. 9 shows the cross-correlator output ($|r_{y,STS}(n)|$), which specifically represents the magnitude of the cross correlation output and the identified local peaks {P}. It is clear that since $|r_{y,STS}(n)| \geq 0$, P in effect is the envelope of $|r_{y,STS}(n)|$. Note that according to equation (3), the calculation of P needs at least n+1 correlator outputs.

In addition to finding local peaks in the correlator output, the LPS also includes some initialisation flags and counters that are necessary for the operation of other algorithms nested within it. The flag 'startPeakAvg' is implemented as a binary variable and is by default set equal to 0. It is set equal to unity when $L_P$ seconds have elapsed since the every first output from the cross-correlator. This duration is known as the 'lead-time'. During the lead-time, all routines of the PFA are inactive except the LPS. Local peaks found during the time interval [0, $L_P$−1] are gathered and they are then used to calculate its running weighted average. This is described in the next section.

A further aspect of the method of the current invention is the STS Peaks Search (SPS) routine, which performs two distinct tasks. First, it detects whether or not an 802.11a packet is received or not. Secondly, if it has found a packet, the SPS then identifies two most appropriate correlation peaks from the first two received STS, such that the chosen peaks are due to the $1^{st}$ multipath tap of the channel impulse response. The SPS is also equipped with a time-out mechanism, which ensures that if the STS peaks are not found within a predefined number of correlation outputs, and then the routine will break out of the search and instead revert back to detecting a packet. This ensures that the timing recovery methods are not stuck in an endless search on occasions when it has falsely detected the presence of a packet.

A transceiver incorporating the method of the current invention while in the receive mode, must assess the medium for the presence of a valid 802.11 packet. The medium is scanned constantly to search for an 802.11a defined packet, and a packet is identified by its characteristic PLCP preamble. Also given the opportunistic behaviour of the CSMA/CA protocol, it is not possible to anticipate when a packet might be transmitted. Therefore, the receiver must constantly process signal measurements at the antenna in anticipation of a packet. In order to do so, receive signal samples are correlated with the reference STS. The correlator output would exhibit distinct peaks for when the received signal is the PLCP header of an 802.11a packet. The SPS routine exploits the magnitude and position properties of the PLCP correlation peaks in order to calculate the start of the packet; also termed packet-start.

The packet detect routine of the SPS uses the local peaks to calculate their weighted running average, $P_{av}$. The $P_{av}(r)$ is the $r^{th}$ calculated running average using all m previously accumulated local peaks, P(m−1), P(m−2), ... P(1). A pre-determined window, $L_P$, is used to accumulate local peaks, P. The set of accumulated peaks during the lead-time $L_P$ is denoted as $P(L_P)$. The size of this window is defined in units of time. After $L_P$ seconds, a weighted average of the accumulated peaks is calculated using the pseudo code, an example of this is given in the appendix. Also, a binary flag startPeakAvg is set to unity, and this implies that $P_{av}$ will now be calculated. The constant $\lceil_1$ is a positive scalar value and it weights the local peaks' average.

Once startPeakAvg=1 is set, the SPS then enters another routine to identify the presence of a packet. This is achieved by comparing the magnitudes of the latest local peak with the most up-to-date value of $P_{av}$. The binary flag, pktDetect is set to unity, once a valid 802.11a packet is detected. The position and magnitude of the $m^{th}$ local peak is marked if it happens to be the peak that indicates the presence of a packet. This is denoted as the packet detect peak, $P_D$. An example of the pseudo code for the packet detect routine is given in the appendix.

Figure 10:
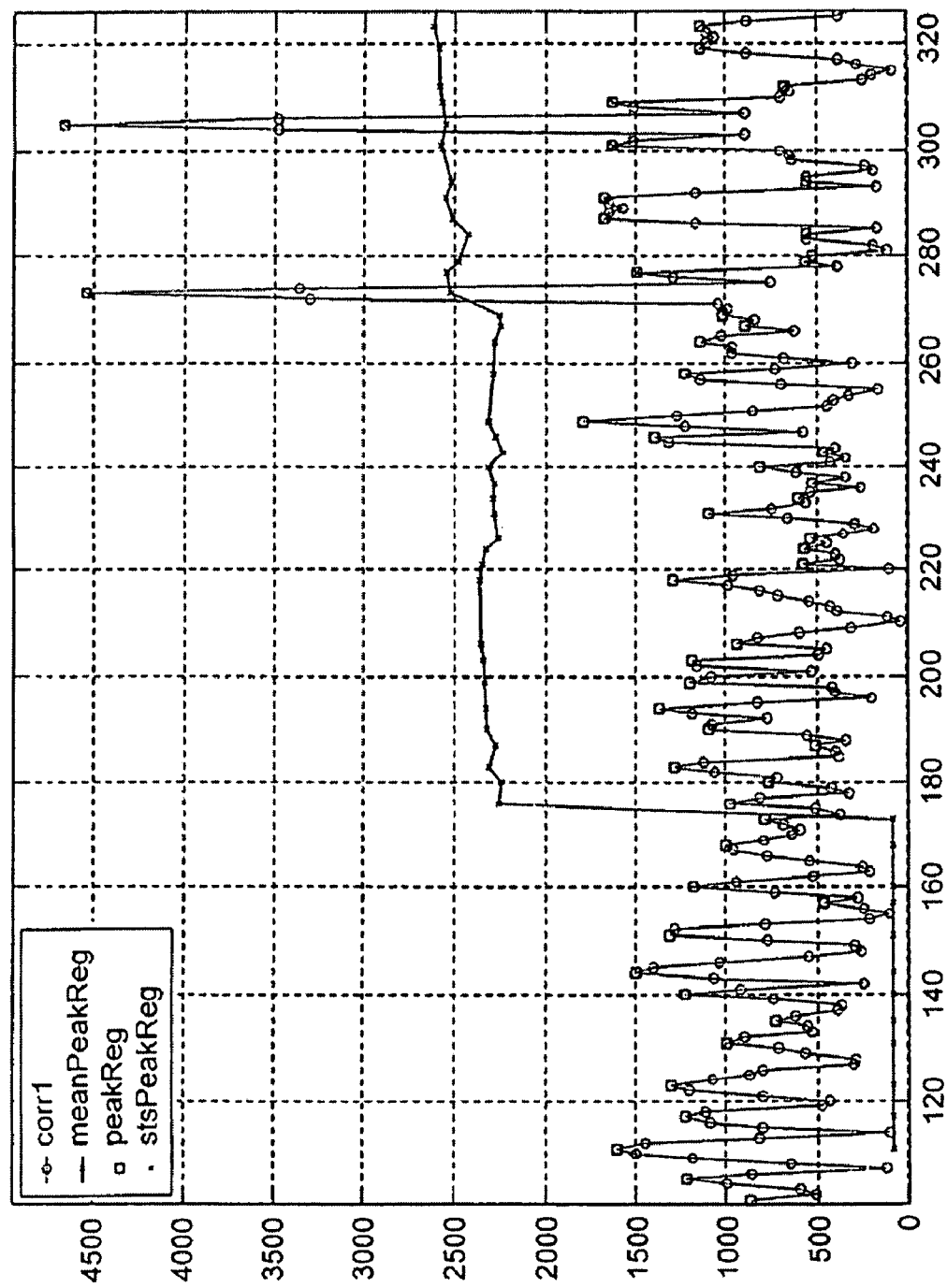
FIG. 10 shows a graph which is an example of the packet detect routine according to one embodiment of the present invention.

After a packet has been detected (i.e., pktDetect=1), the SPS then considers all local peaks as STS correlation peaks and they are marked accordingly, $P_{tn}$; where the subscript tn represents the 10 STSs. This is shown in FIG. 10, which is an example of the packet detect routine. The circled region in the figure corresponds to the local peak when its value exceeds that of the $P_{av}$. This implies that the magnitude of that particular latest local peak is considerably large in comparison to previously accrued peaks, and that suggests a strong correlation not previously observed. The SPS then uses $P_{tn}$ to search for the $1^{st}$ multipath component of the channel impulse response for STS#1 and STS#2, i.e., $P^1_{t1}$ and $P^1_{t2}$ respectively. All $P_{tn}$, are indexed using the counter sm, and they are initialised in the packet detect routine.

Having established that the correlator outputs are due to received PLCP preamble, the SPS then embarks on a peak search routine wherein it attempts to isolate the $1^{st}$ multipath component of the channel impulse response for STS#1 and STS#2, i.e., $P^1_{t1}$ and $P^1_{t2}$ respectively. A weighted running average of $P_{tn}$ is calculated over 16 observed peaks (including the current one). This average is denoted as, $P^{av}_{tn}(j)$. If the magnitude of a STS correlation peak is found to be greater than the current value of $P^{av}_{tn}(j)$ and it is also greater than a pre-defined constant $\psi$, then that peak is considered to be a likely candidate $1^{st}$ multipath component of the channel impulse response for STS#n, and it is represented as $\hat{P}^1_{tn}(sp)$. All such candidate peaks $\hat{P}^1_{tn}(sp)$ are referred to as STS_MAX peaks and they are indexed using the counter sp.

An overview of an exemplary SPS routine is given in the appendix which contains the pseudo code for the whole SPS routine. Notice that the shaded regions are the 'Antenna Select' and 'AGC update' functions of the synchronisation method, which were referred to earlier in the description and more specifically in FIG. 8, block 328; that are nested within the overall timing recovery method. This is because the packet-start value output from the timing recovery's Fine Peak Select routine is used as a reference counter to set appropriate timing epochs. Accordingly, when stsNumber=4, STS#4 is said to be received and hence the 'Antenna Select' and 'AGC update' functions of the synchronisation method are then invoked.

Reliable timing recovery is attained by using only the first 2 MAX_PEAKS, $P^1_{t1}$ and $P^1_{t2}$. Therefore the maximum value of the index sp is set to 2. Given that STS#1 and STS#2 are the first two STS to be received, the SPS continuously searches for the two most likely peaks $\hat{P}^1_{t1}(1)$ and $\hat{P}^1_{t2}(2)$ such that they would pass 4 STS_MAX tests. These tests consider the magnitude and position of the likely peaks to decide if the two peaks or any one of them is a likely candidate MAX_PEAK, $P^1_{t1}$ or $P^1_{t2}$ respectively. Either $\hat{P}^1_{tn}(1)$ or $\hat{P}^1_{tn}(2)$ or both may be discarded at the end of the 4 tests. Discarded peaks are no longer considered and the method waits until a new $\hat{P}^1_{tn}(sp)$ is available and once again candidate MAX_PEAKS are assembled.

The newly assembled pair of STS_MAX peaks $\hat{P}^1_{tn}(1)$ and $\hat{P}^1_{tn}(2)$ is then used to perform the 4 tests once again to confirm whether or not the pair is the desired MAX_PEAKS, $P^1_{t1}$ and $P^1_{t2}$, or not. This process continues until a pair of STS_MAX peaks $\hat{P}^1_{tn}(1)$ and $\hat{P}^1_{tn}(2)$ is found such that they pass the 4 tests. This event is marked by setting the binary flag 'twoPeaksFound' to equal to unity. Once this is so set, the SPS stops searching for STS_MAX peaks $\hat{P}^1_{tn}(1)$ and $\hat{P}^1_{tn}(2)$. At this point, the SPS method is said to have converged on the $1^{st}$ multipath component of the STS correlation peaks for STS#1 and STS#2.

Examples of the 4 STS_MAX tests are defined in the appendix. Each test is appropriately invoked when:
packet detect peak $P_D$ is a STS_MAX peak, i.e., $\hat{P}^1_{tn}(1)$;
difference in the positions of STS_MAX peaks $\hat{P}^1_{tn}(1)$ and $\hat{P}^1_{tn}(2)$ is greater than 32;
difference in the positions of STS_MAX peaks $\hat{P}^1_{tn}(1)$ and $\hat{P}^1_{tn}(2)$ is less than 32; and
difference in the positions of STS_MAX peaks $\hat{P}^1_{tn}(1)$ and $\hat{P}^1_{tn}(2)$ is equal 32.

The Fine Peak Select (FPS) routine is then invoked on the pair $\hat{P}^1_{t1}(1)$ and $\hat{P}^1_{t2}(2)$ that have successfully passed the 4 STS_MAX tests. The output of the FPS is the packet-start value, and it refers to the position of the $1^{st}$ sample of the received packet. This value is then used as a counter to establish sample timing within the received packet. Also, a binary status flag 'syncFound' is set to unity to suggest that synchronisation has been achieved. By using derived packet-start value and subsequent STS_MAX peaks $\hat{P}^1_{tn}$ the SPS is able to establish a reference counter, stsNumber. This is updated periodically to mark the reception of STS#3, STS#4, and so on.

The SPS implements a time-out mechanism in order to prevent it from endless searching for MAX_PEAKS. The latter may occur if the packet detect routine incorrectly converged to a peak $P_D$. This is typical for when received signal SNR is low (i.e., at low receiver sensitivity) wherein the margin for error is small. The time-out mechanism ensures that the binary flag 'pktDetect' is set back to zero if packet-start value is not found within $\Delta$ (delta) correlator outputs after $P_D$. This is shown in the example of the SPS pseudo code in the appendix.

The Fine Peak Select (FPS) routine is the inner most loop of the PFA method (FIG. 8). It is invoked only if two peaks $\hat{P}^1_{t1}(1)$ and $\hat{P}^1_{t2}(2)$ are successfully found from the SPS routine. The FPS performs a final check to ensure that the $1^{st}$ multipath component of the STS correlation is not ignored if it does not happen to be a local peak.

Note that the STS correlation peaks do not exactly reflect the channel impulse response. The combination of dominant pre-lobes and poor SNR may cause the desired $1^{st}$ multipath peak to be buried and not yield a distinct peak. It is therefore necessary to check within the immediate neighbourhood of the found MAX_PEAKS for correlation outputs that are of similar magnitude. The FPS performs this check for both $\hat{P}^1_{t1}(1)$ and $\hat{P}^1_{t2}(2)$ peaks. If needed either one or both of these peaks are replaced by a neighbouring correlation output that may not necessarily be a local peak. An example of the pseudo code of the FPS routine is given in the appendix.

The packet-start value (referred to as pktStart) is adjusted by a number: pktDelay. The latter is a scalar value and is optimised by trial and error simulations. The PFA method is said to have converged once a packet-start value is derived. Following this, the binary status flag 'syncFound' is set to unity and a reference counter stsNumber is set equal to 2; to imply that STS#1 and STS#2 are received.

Figure 11:
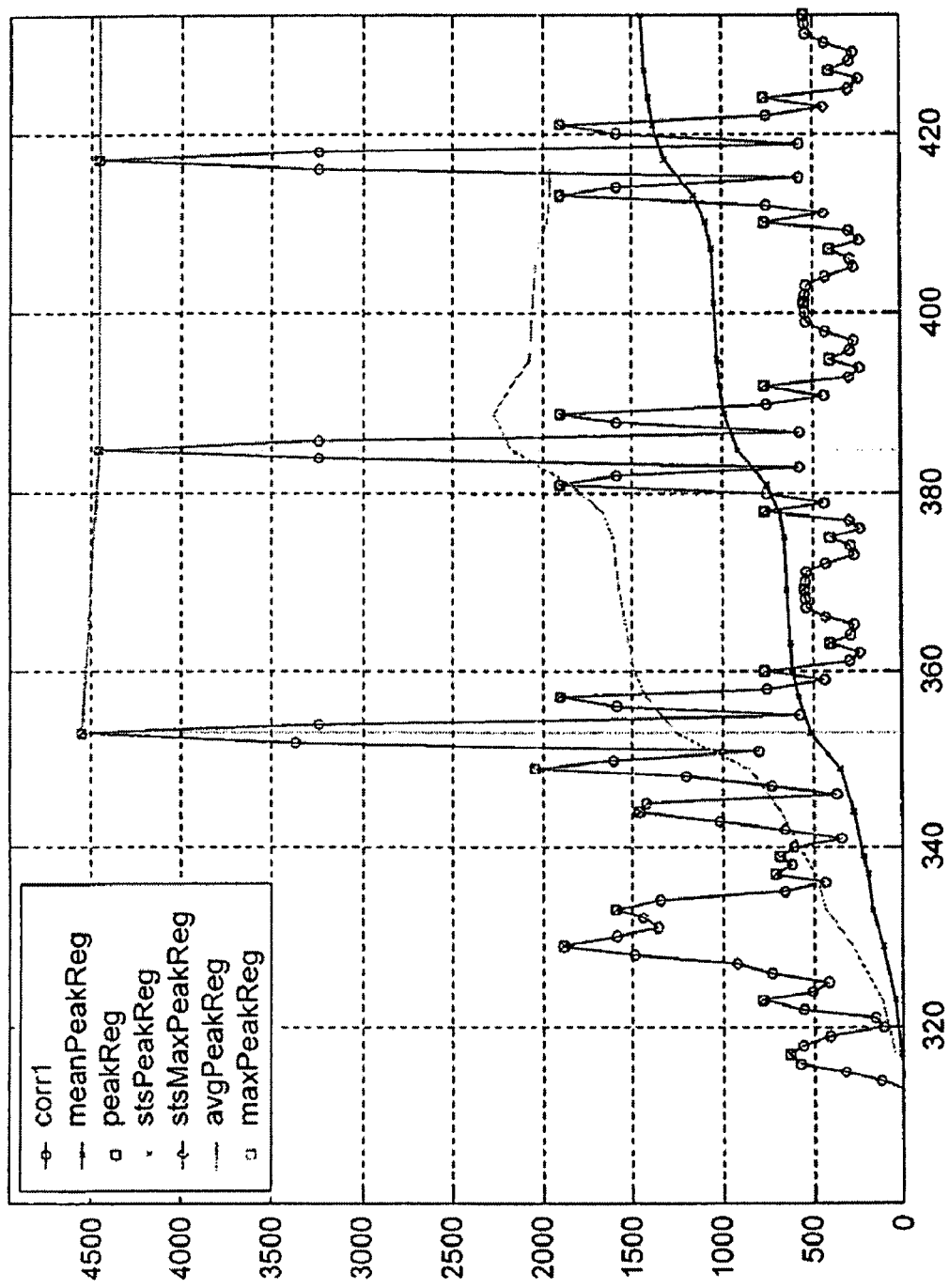
FIG. 11 shows a graph of the operation of the SPS and FPS method once $P_D$ has been located according to the present invention.

FIG. 11 shows a graph of the operation of the SPS and FPS method once $P_D$ has been found. The first two STS_MAX peaks are identified and then tested to confirm them as MAX_PEAKS. The circled region shows the lack of strong correlation value in the immediate neighbourhood of the two peaks, and so the FPS returns the SPS derived MAX_PEAKS as the confirmed MAX_PEAKS.

The timing recovery method is assessed in response to different conditions to understanding how the PFA and its constituent search routines operate to isolate the $1^{st}$ multipath tap of the channel impulse response from within the correlator output. Examples herein include different channel types and receiver sensitivities.

Figure 12:
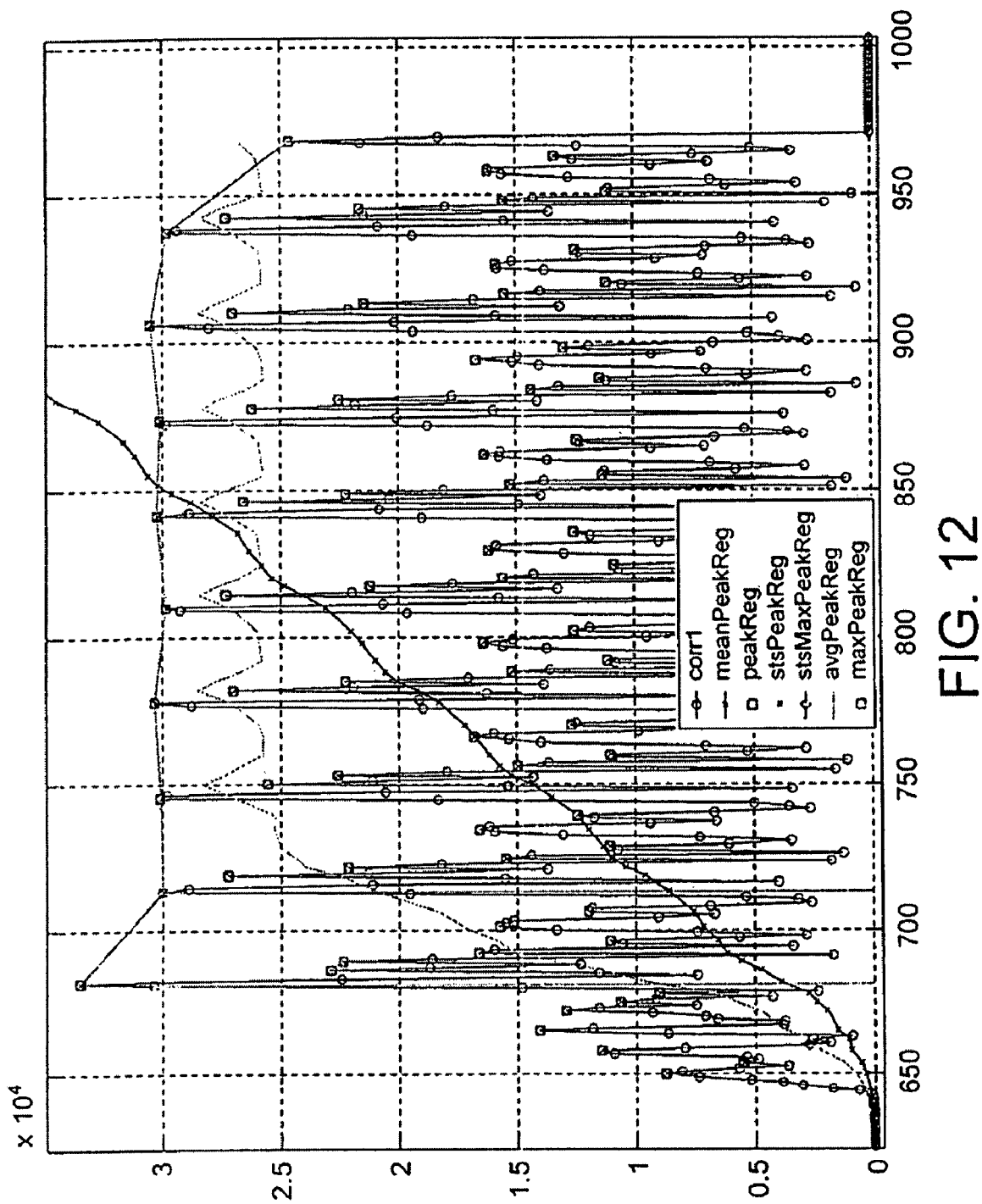
FIG. 12 shows a graph of the operation of the PFA in multipath with high receiver sensitivity in accordance with the present invention.

FIG. 12 shows the operation of the PFA in multipath with high receiver sensitivity. The time-dispersive property of the multipath channel distorts the STS correlation output. It introduces additional correlation peaks due to the multi-tap channel impulse response. However, the SPS routine of the PFA with its characteristic magnitude and position tests ensures that the desired MAX_PEAKS are picked out in amongst the several STS correlation peaks. The FPS ensures that not necessarily the strongest peak is selected but the one, which corresponds to the $1^{st}$ multipath component.

The current invention is applicable to any packet-based network or system using short training sequences, wherein the PHY layer packets are transmitted over air are synchronised at the receiver by exploiting the presence of a predefined packet preamble. Further, it will be apparent to the skilled person in the art that variations and modifications can be made to the described embodiments without departing from the scope of the invention.

APPENDIX

The following is an exemplary pseudo code for calculating a weighted average of the accumulated peaks

```
if startPeakAvg = 1
    if P(L_p) ≥ 64
```
$$P_{av}(r) = \frac{\Gamma_1}{64} \sum_{i=P(L_p)-64}^{P(L_p)} |P_i|$$

```
    else if P(L_p) ≥ 32 and P(L_p) < 64
```
$$P_{av}(r) = \frac{\Gamma_1}{32} \sum_{i=P(L_p)-32}^{P(L_p)} |P_i|$$

```
    else
        P_av(r) = ζ
    end
    r = r+1
end
```

The following represents a pseudo code that may be used to summarize the packet detect routine.

```
if pktDetect = 0 and startPeakAvg = 1
    if P(m) > ζ and P(m) > P_av(r-1)
        pktDetect = 1
        P_D = P(m)
        sm = 1, sp = 1
    end
end
```

```
if pktDetect = 1 and m > 16
    P_tn(sm) = P(m)
```
$$P_{tn}^{av}(j) = \frac{\Gamma_2}{16} \sum_{i=m-16}^{m} |P_i|$$

```
    j = j + 1
    if sm ≥ 3 and sp ≤ 2
        if P_tn(sm-1) > P_tn^av(j-1) and P_tn(sm-1) > ψ
            P̂_tn^1(sp) = P_tn(sm-1)
            STS_MAX Test 1
            STS_MAX Test 2
            STS_MAX Test 3
            STS_MAX Test 4
            Fine Peak Select routine
            sp = sp + 1
        end
    end
    if (syncFound ≠1 and pktDetct = 1) and (m > pos[P_D] + Δ)
        pktDetect = 0
    end
    if syncFound = 1 and sp ≥ 3
        if pos[P_tn(sm)] – pos[P_tn^1(sp – 1)] ∈ [30,34]
            P_tn^1(sp) = P_tn
            sp = sp +1
            stsNumber = stsNumber + 1
        end
        switch (stsNumber)
            case (3)
            case(4)
                Select Antenna
                Set AGC
            case(5)
            case(6)
            case(7)
            case(8)
            case(9)
            case(10)
        end
    end
    sm = sm + 1
end
```

The above is an exemplary representation of an overview of the SPS routine.

The following represents pseudo code for STS_MAX test 1.

```
if sp = 1
    if ( mag[P̂_tn^1(sp)] ≤ α_1.mag[P_D]) and ( pos[P̂_tn^1(sp)] – pos[P_D] ≤ 34 )
        P̂_tn^1(sp + 1) = P̂_tn^1(sp)
        P̂_tn^1(sp) = P_D
        sp = 2
    end
end
```

The following represents pseudo code for STS_MAX test 2.

```
if (sp = 2) and ( pos[P̂_tn^1(sp)] – pos[P̂_tn^1(sp – 1)]>32 )
    pkDist = pos[P̂_tn^1(sp)] – pos[P̂_tn^1(sp – 1)]
    p1 = mag[P̂_tn^1(sp – 1)]; p2 = mag[P̂_tn^1(sp)]
    if (p2 ≥α_2.p1) and (pkDist ≤ 37)
        P̂_tn^1(sp – 1) = P̂_tn^1(sp)
        sp = 1
    else if (p2 < α_2.p1) and (pkDist ≤ 37)
```

-continued

```
      sp = 2
      twoPeaksFound = 1
   else if (p2 ≥α₂.p1) and (pkDist > 37)
      P̂_tn¹(sp − 1) = P̂_tn¹(sp)
      sp = 1
   else if (p2 < α₂.p1) and (pkDist > 37)
      P̂_tn¹(sp − 1) = P̂_tn¹(sp)
      sp = 1
   end
end
```

The following represents pseudo code for STS_MAX test 3.

```
if (sp = 2) and ( pos[P̂_tn¹(sp)] − pos[P̂_tn¹(sp − 1)]<32 )
   pkDist = pos[P̂_tn¹(sp)] − pos[P̂_tn¹(sp − 1)]
   p1 = mag[P̂_tn¹(sp − 1)]; p2 = mag[P̂_tn¹(sp)]
   if (p2 ≥α₃.p1) and (pkDist ≥29)
      P̂_tn¹(sp − 1) = P̂_tn¹(sp)
      sp = 1
   else if (p2 < α₃.p1) and (pkDist ≥29)
      sp = 2
      twoPeaksFound = 1
   else if (p2 ≥α₃.p1) and (pkDist < 29)
      P̂_tn¹(sp − 1) = P̂_tn¹(sp)
      sp = 1
   else (p2 < α₂.p1) and (pkDist < 29)
      if (pkDist < 6)
         if (p2 > β₁.p1)
            P̂_tn¹(sp − 1) = P̂_tn¹(sp)
            sp = 1
         else
            sp = 1
         end
      else if (pktDist ≥6) and (p2 > p1)
         if (p2 > β₂.p1)
            P̂_tn¹(sp − 1) = P̂_tn¹(sp)
            sp = 1
         else
            sp = 1
         end
      else if (pktDist ≥6) and (p2 ≤ p1)
         if (p2 > β₃.p1)
            P̂_tn¹(sp − 1) = P̂_tn¹(sp)
            sp = 1
         else
            sp = 1
         end
      end
   end
end
```

The following represents pseudo code for STS_MAX test 4.

```
if (sp = 2) and (pos[P̂_tn¹(sp)] − pos[P̂_tn¹(sp − 1)]=32)
   pkDist = pos[P̂_tn¹(sp)] − pos[P̂_tn¹(sp − 1)]
   p1 = mag[P̂_tn¹(sp − 1)]; p2 = mag[P̂_tn¹(sp)]
   if p2 > γ.p1
      P̂_tn¹(sp − 1) = P̂_tn¹(sp)
      sp = 1
   else
      twoPeaksFound = 1
   end
end
```

The following represents a pseudo code of the FPS routine.

```
if (sp = 2) and (twoPeaksFound = 1)
   for (sp = 1 to 2)
      if ( P̂_tn¹(sp) < λ · |r_{y,STS}(pos[P̂_tn¹(sp)] − 1)| ) and
         (|r_{y,STS}(pos[P̂_tn¹(sp)] − 1)| > P_tn^{av}(j − 1) )
         P_tn¹(sp) = |r_{y,STS}(pos[P̂_tn¹(sp)] − 1)|
      else
         P_tn¹(sp) = P̂_tn¹(sp)
      end
   end pktStart = ½{(pos[P_tn¹(sp)] − 32)+ (pos[P_tn¹(sp − 1)])} − pktDelay syncFound = 1
   stsNumber = 2
end
```

What is claimed is:

1. A method of identifying a signature point within at least one received digital data frame transmitted over a communication link, said received frame containing a plurality of predefined identification markers, the method comprising:
   (a) generating a signal whose magnitude is determined by the correlation of a reference signal with first and second predefined identification markers in the received signal;
   (b) comparing, with a threshold, at least a first and second magnitude of the signal when the gradient of the correlated signal reaches or crosses a predetermined value;
   (c) storing the first and second signal magnitudes, and the corresponding first and second sample times thereof when said first and second magnitudes exceed said running threshold; and
   (d) identifying the presence of the signature point within the data frame on the basis of the gap between the first and second sample times.

2. A method as claimed in claim 1, wherein said predetermined value of said gradient is indicative of a local maximum of the generated signal.

3. A method as claimed in claim 1, wherein the gradient of the signal is only measured for a specified number of correlation samples.

4. A method as claimed in claim 1, further comprising:
   (e) ceasing step (b) if said first and second magnitude does not reach said threshold within a defined number of correlation samples.

5. A method as claimed in claim 1, wherein said threshold is the average signal strength of said generated signal over a predetermined number of correlation samples.

6. A method as claimed in claim 5, wherein said average signal strength is weighted by a scalar value.

7. A method as claimed in claim 1, further comprising:
   (f) calculating the start time of the received data frame on the basis of the identified signature point.

8. A method as claimed in claim 1, further comprising:
   (g) synchronizing the digital data frame in accordance with the identified signature point.

9. A method as claimed in claim 1, further comprising:
   (h) determining the sampling point of the received signal on the basis of the identified signature point.

10. A method as claimed in claim 1, further comprising:
(i) searching within a number of correlator samples around the first and second sample times for a third magnitude that is substantially the same as the first or second magnitude, the corresponding third sample time thereof being stored.

11. A method as claimed in claim 7, further comprising:
(j) searching within a number of correlator samples around the first and second sample times for a third magnitude that is substantially the same as the first or second magnitude, the corresponding third sample time thereof being stored.

12. A method as claimed in claim 11, further comprising:
(k) recalculating the start time of the received data frame in accordance with the third sample time.

13. A method as claimed in claim 1, wherein the reference signal corresponds with one of said predefined identification markers.

14. A method as claimed in claim 1, wherein the reference signal is derived from one of said predefined identification markers.

15. An Application Specific Integrated Circuit (ASIC) comprising:
(a) means for generating a signal whose magnitude is determined by the correlation of a reference signal with first and second predefined identification markers in the received signal;
(b) means for comparing, with a threshold, at least a first and second magnitude of the signal when the gradient of the correlated signal reaches or crosses a predetermined value;
(c) means for storing the first and second signal magnitudes, and the corresponding first and second sample times thereof when said first and second magnitudes exceed said running threshold; and
(d) means for identifying the presence of the signature point within the data frame on the basis of the gap between the first and second sample times.

* * * * *